J. THOMPSON.
Thrashing Machine.

No. 8,864.

Patented April 6, 1852.

UNITED STATES PATENT OFFICE.

JOHN THOMPSON, OF CHILI, NEW YORK, ASSIGNOR TO JOSEPH HALL, OF ROCHESTER, NEW YORK.

GRAIN-SEPARATOR.

Specification of Letters Patent No. 8,864, dated April 6, 1852.

*To all whom it may concern:*

Be it known that I, JOHN THOMPSON, of Chili, in the county of Monroe and State of New York, (assignor to JOSEPH HALL, of Rochester, in said county and State,) have invented certain new and useful Improvements in Threshing-Machines and Grain-Separators; and I do hereby declare that the following is a full, clear, and exact description thereof, reference being had to the accompanying drawing and letters marked thereon, forming a part of this specification.

The nature of my improvements consists in feeding the grain to the machine in a more desirable manner, together with the arrangement for separating the grain from the straw, whereby a more perfect separation and saving of the grain is attained, without injury to the same, than anything heretofore known or used as far as I am acquainted.

My improvement in the feeding arrangement consists, in the use of a roller in addition to and placed immediately in the rear of the large feeding roller, said roller being provided with numerous teeth, and is for the purpose of taking hold of the straw as it rotates, and conducting the same, without the least injury to the grain, to the action of the separating portion of the machinery.

My improvement in the separating portion of the machinery consists, in the use of a series of inclined slats provided with teeth, which slats rise and fall so as to alternately raise and depress the grain, in its passage through the machine, bringing it more effectually under the action of other teeth, said slats being placed over an inclined endless apron rotating immediately under them for collecting and passing the grain into the winnowing portion of the machinery, which forms a part of my machine, and also in the use of a series of toothed slats attached to endless bands, said slats having a lateral as well as a rotating motion, so placed over the inclined slats $e$, $e$, $e$, $e$, that they operate in conjunction in the manner hereinafter described, separating the grain in a perfect and desirable manner from the straw in one single operation or passage through the machine.

Figure 1:
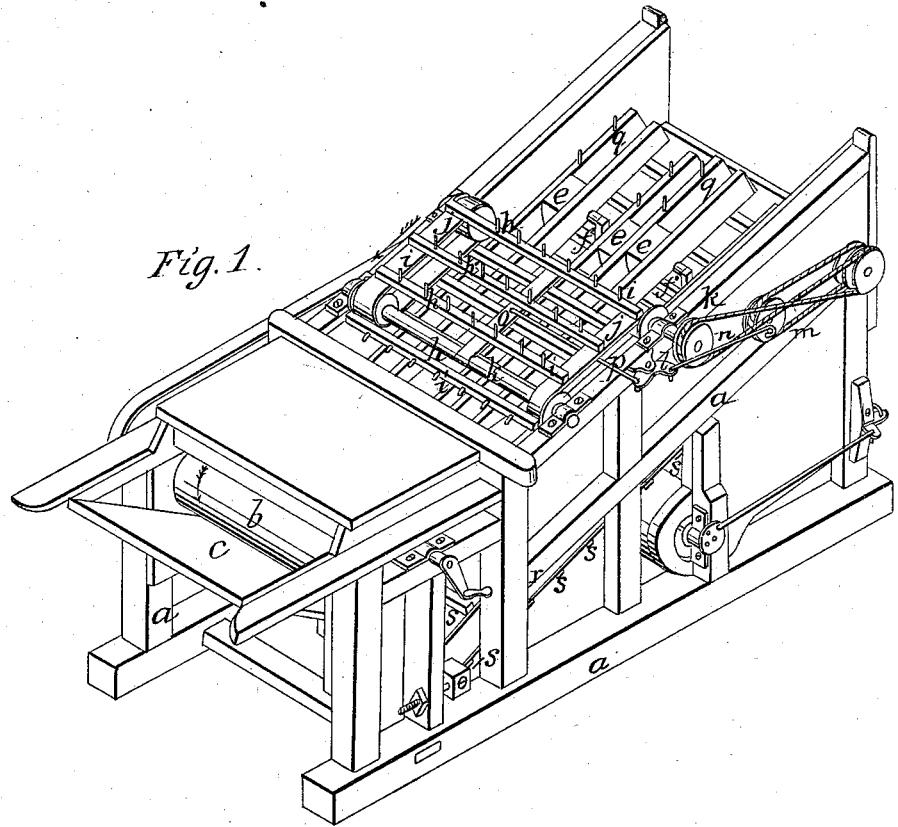
Figure 2:
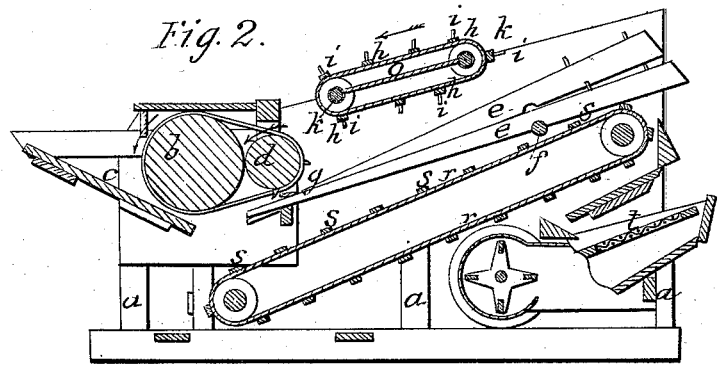

The accompanying drawing represents an isometrical view (Figure 1) of my improved grain separator combined with a winnowing machine and a longitudinal vertical section (Fig. 2) of the same. In each of these views where the same parts are shown they are designated by the same letters of reference.

$a$, $a$, $a$, the main frame constructed in any desirable manner to give the necessary support to the machinery, $b$ the large feed roller placed in the feeding end of the machine over the inclined plane or platform $c$, upon which the grain in the straw is placed. In addition to the usual feed roller $b$, I provide a roller $d$, placed immediately in the rear of the roller $b$, and revolving in the same plane and direction with it, which roller is provided with teeth slightly curved as represented in the drawing. This roller has the effect to assist the main feed roller $b$, in conducting the grain in the straw on to the slats $e$, $e$, $e$, $e$, keeping it straight and constantly moving to the action of the separators. The slats $e$, $e$, $e$, $e$, I propose to have of any desired number. They are elevated and depressed by a shaft $f$, with a set of cranks, to which they are jointed, their lower ends sliding between a cross beam and a thin slat $g$, the slat $g$ being close to the teeth of the roller $d$, so as to draw the grain between it and the teeth on the roller $d$.

Operating conjointly with the inclined slats $e$, $e$, $e$, $e$, is an arrangement of mechanism, which consists of a series of slats $h$, $h$, $h$, $h$, of any desired number. Said slats are provided with teeth $i$, $i$, secured irregularly to them, and said slats are secured to the endless bands $j$ $j$ which bands pass around pulleys on the shafts $k$, $k$, so as to rotate the slats $h$, $h$, $h$, $h$, in the direction of the arrow. In addition to this rotary motion given to the slats $h$, $h$, $h$, $h$, by the endless bands $j$, $j$, they have a lateral movement, which is produced by the elbow lever $l$, having its fulcrum on the main frame, which is connected with the crank shaft $f$, by a crank and rod $m$, $n$, and the elbow lever is jointed to a rod or plate $o$, by the connecting rod $p$. Thus a double rotary and lateral reciprocating motion is given to the slats $h$, $h$, $h$, $h$, which operating conjointly with the inclined slats $e$, $e$, $e$, $e$, and the teeth $q$, $q$, thereon, have the effect of separating in a perfect and rapid manner the grain from the straw which after separation falls onto the endless apron $r$, which conducts it to the winnowing portion of the machinery. This apron is provided with slats $s$, $s$, $s$, $s$, for the grain to lodge against so as to be raised up and delivered into the sieve *t*.

Having thus fully described my improved threshing machine, what I claim therein as new and desire to secure by Letters Patent is—

The novel arrangement for separating the grain from the straw by which the slats *h, h, h, h,* provided with teeth have a rotary and lateral motion, said motion produced substantially as described, or in any substantially equivalent manner, in combination with the inclined slats *e, e, e, e,* whereby by their combined action the grain is perfectly and rapidly separated from the straw—operating in the manner and for the purpose herein fully set forth.

In testimony whereof I have hereunto signed my name before two subscribing witnesses.

JOHN THOMPSON.

Witnesses:
F. S. MYER,
GEO. R. WEST.